Aug. 4, 1931.  H. H. BARBER  1,817,474
FEEDER FOR BUCKET LOADERS
Filed Oct. 7, 1929  2 Sheets-Sheet 2
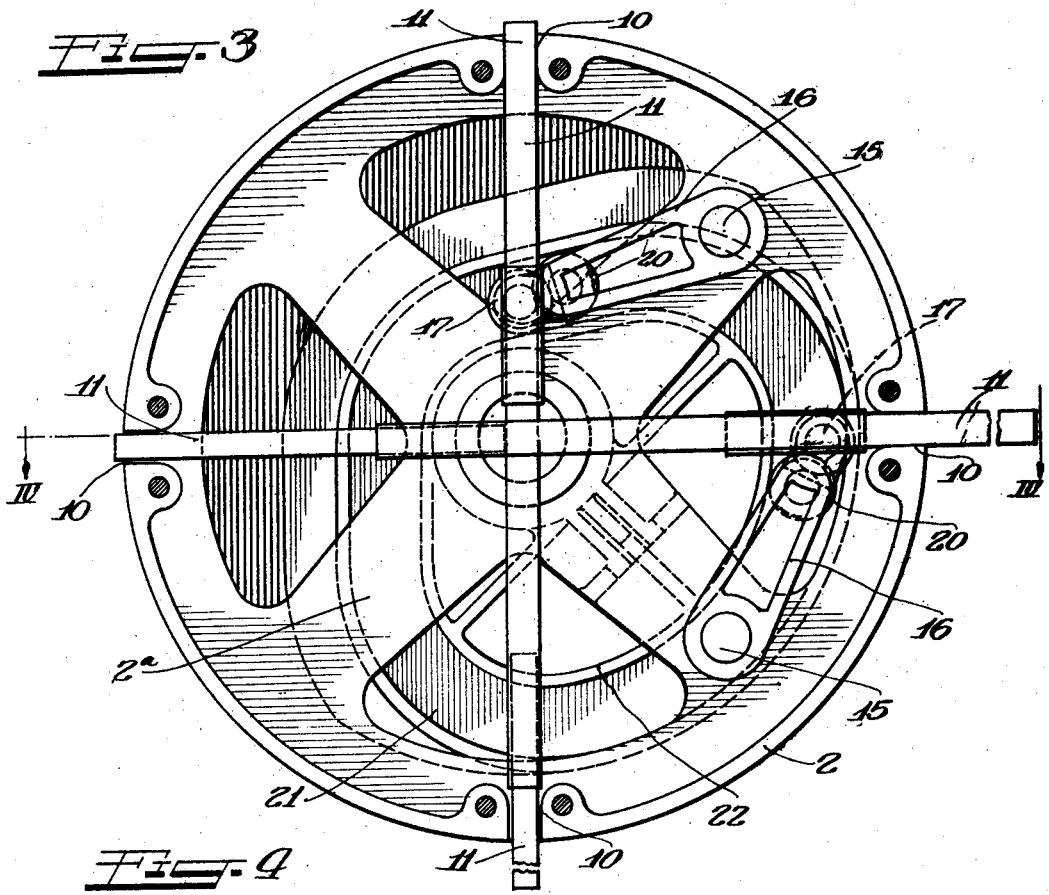
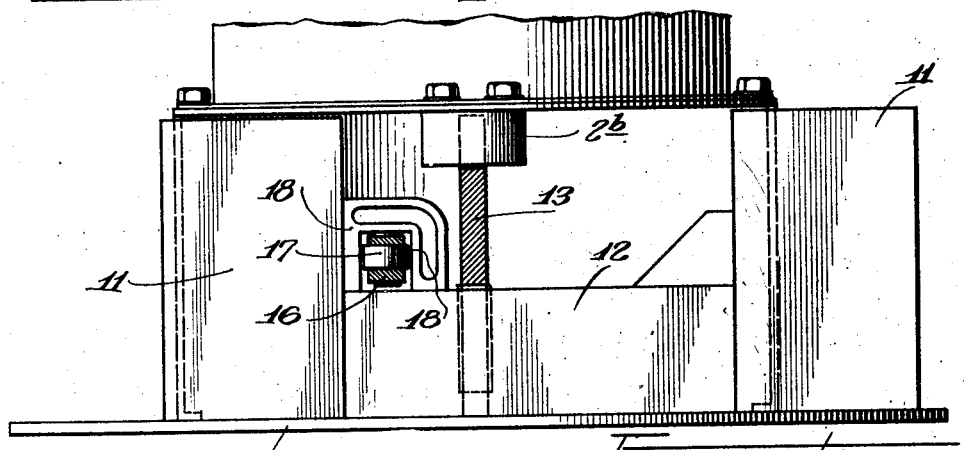
Inventor:
Harry H. Barber Patented Aug. 4, 1931

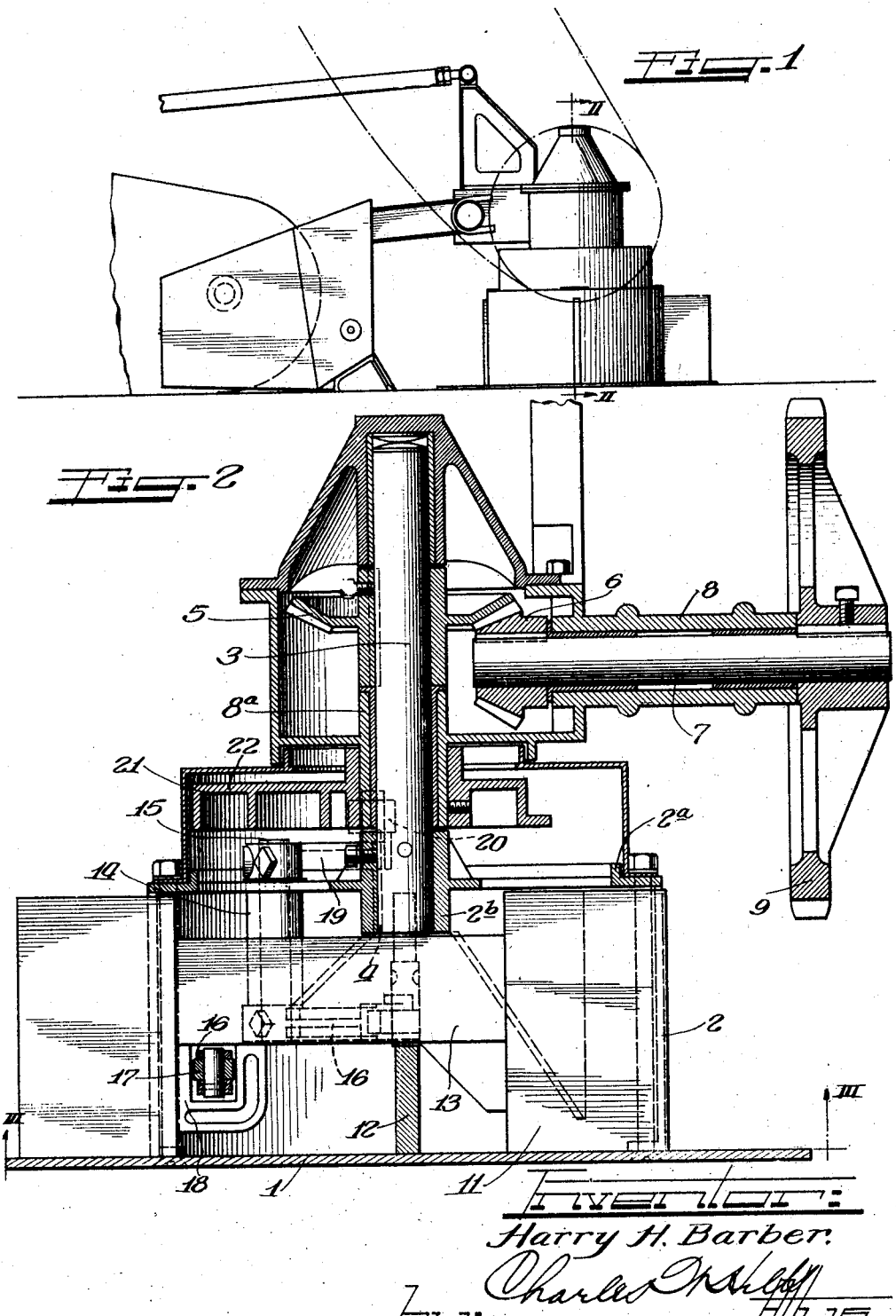

1,817,474

UNITED STATES PATENT OFFICE

HARRY H. BARBER, OF AURORA, ILLINOIS, ASSIGNOR TO BARBER-GREENE COMPANY, A CORPORATION OF ILLINOIS

FEEDER FOR BUCKET LOADERS

Application filed October 7, 1929. Serial No. 397,912.

This invention relates to feeding mechanism for bucket loader of the type found in the Barber Patent No. 1,630,598.

It is an object of this invention to improve the type of feeder shown in the above mentioned patent so that the bucket may be more quickly and effectively filled. According to this invention, this is accomplished by the use of rotatable drums with reciprocating paddles for carrying the material to the bucket and which recede at the proper time in order to pass by the buckets as the drums rotate.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a fragmentary elevational view of a bucket loader illustrating the improved feeding mechanism therefor.

Figure 2 is an enlarged vertical sectional view taken upon the line II—II of Figure 1, showing parts in elevation.

Figure 3 is an enlarged sectional view taken upon the line III—III of Figure 2, looking in the direction of the arrows.

Figure 4 is an enlarged sectional view taken upon the line IV—IV of Figure 3, with the upper portion of the mechanism broken away.

It will be understood that the bucket loader embodies an endless bucket chain which passes between a pair of rotatable drums or turrets which carry the material inwardly to the buckets from both sides. Only one of the turrets or drums has been illustrated, since they are both of the same construction. Each drum or feeder embodies a lower disc 1 upon which a cylindrical drum 2 is secured. It will be noted that the disc 1 projects considerably beyond the periphery of the drum in order to pick up the material that is carried to the bucket. The upper margin of the drum 2 is in the form of a spider 2a provided with a suitable hub 2b for receiving an operating shaft 3 which is keyed to the hub 2b as indicated at 4. The shaft 3 carries a beveled gear 5 which is secured thereto, and this beveled gear 5 meshes with a beveled driving pinion 6 which is keyed upon the end of a shaft 7 journalled in a housing 8 which is provided with a bearing hub 8a which surrounds the shaft 3. The shaft 7 carries a sprocket wheel 9 whereby the shaft 7 may be rotated. It might be mentioned that the shaft 7 extends to the other cooperating feeding mechanism.

The drum 2 is provided with two pairs of diametrically opposite slots 10 as shown more clearly in Figure 3. Suitable feeding paddles 11 are mounted, as will hereafter be more fully explained, for reciprocating movement through the slots. One pair of diametrically opposite paddles is connected by a narrower strip 12 as shown in Figure 2, while the other pair of diametrically opposite paddles 11 is connected by a narrower strip 13 which is positioned above the strip 12 whereby these paddles may reciprocate without interfering with each other.

The above mentioned spider 2a is provided with a pair of depending bearing sleeves 14, one of which is shown in Figure 2. A shaft 15 is journalled in each bearing sleeve 14. The lower end of each shaft 15 carries a crank arm 16 which has a bifurcated outer end in which a roller 17 is mounted. One crank arm 16 and its roller 17 extend into a loop formed by a U-shaped bracket 18 attached to the lower surface of the connecting piece 13 of the pair of paddles 11, as shown in Figure 2. The other crank arm 16 and its roller 17 extend through a similar U-shaped bracket 18 attached upon the upper surface of the connecting portion 12 of the other pair of paddles 11. The upper end of each shaft 15 has rigidly secured thereon, a crank arm 19 which carries a roller 20 suitably mounted thereon. The rollers 20 are located in a cam groove 21 which is formed in a suitable cam 22, which is rigidly secured against rotation on the hub 8a of the aforementioned housing.

The operation of the aforedescribed mechanism is as follows:

When the shaft 3 is rotated, the drum 2 and the spider 2a will rotate therewith, carrying the crank arms 16 therewith, while the rollers 20 of the crank arms 19 rotate in the stationary cam groove, with the result that the paddles will be caused to reciprocate with respect to the drum during such rotation. The cam 22 is so designed that the paddles will be projected through the drum for carrying material to the bucket and will be retracted into the drum just before the bucket is encountered, in order to pass the same.

From the foregoing, it will be apparent that a novel feeding mechanism has been provided which is designed to convey the material to the buckets in a very positive and efficient manner and in which the conveying paddles are so designed that they will be reciprocated in a direction away from the buckets so as not to strike or encounter the same.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A bucket loading device comprising a rotatable disk, a drum secured upon said disk, said drum having a plurality of pairs of alined slots, a material advancing element extending through each pair of slots, the intermediate portions of said elements being reduced for crossing each other and means for reciprocating said elements.

2. In a bucket loader comprising an endless bucket chain, means for feeding material to said bucket chain comprising a pair of rotatable disks having drums thereon, each drum having a plurality of pairs of alined slots, a material advancing element projecting through each pair of slots and crossing each other and means for reciprocating said elements.

3. A bucket loading device comprising a rotatable disk, a drum secured upon said disk, said drum having a pair of alined slots, a material advancing element slidably extending through said alined slots and means for periodically reciprocating said element.

In testimony whereof I have hereunto subscribed my name at Aurora, Kane County, Illinois.

HARRY H. BARBER.